US005345606A

United States Patent [19]

Duckeck et al.

[11] Patent Number: 5,345,606

[45] Date of Patent: Sep. 6, 1994

[54] RDS RADIO RECEIVER WITH USER-DEFINABLE-REGION FILTERING

[75] Inventors: Ralf Duckeck; Peter Bre,uml/a/ gas, both of Hildesheim, Fed. Rep. of Germany

[73] Assignee: Robert Bosch GmbH, Stuttgart, Fed. Rep. of Germany

[21] Appl. No.: 775,939

[22] PCT Filed: Mar. 28, 1990

[86] PCT No.: PCT/DE90/00250

§ 371 Date: Oct. 28, 1991

§ 102(e) Date: Oct. 28, 1991

[87] PCT Pub. No.: WO90/13882

PCT Pub. Date: Nov. 15, 1990

[30] Foreign Application Priority Data

Apr. 28, 1989 [DE] Fed. Rep. of Germany ....... 3914104

[51] Int. Cl.[5] ............................................ H04B 4/06

[52] U.S. Cl. ................................ 455/186.1; 455/345; 455/185.1

[58] Field of Search .................. 455/185.1, 186.1, 228, 455/345, 186.2, 45, 38.2, 38.4; 340/905

[56] References Cited

U.S. PATENT DOCUMENTS 4,969,209 11/1990 Schwob ........................... 455/186.1

5,020,143 5/1991 Duckeck et al. .................... 455/345

FOREIGN PATENT DOCUMENTS 0263332 4/1988 European Pat. Off. .

0300205 1/1989 European Pat. Off. .

*Primary Examiner*—Reinhard J. Eisenzopf

*Assistant Examiner*—Chi Pham

*Attorney, Agent, or Firm*—Frishauf, Holtz Goodman & Woodward

[57] ABSTRACT

Memory devices containing route-specific features as well as standardized texts are provided in vehicle receivers having a decoder for decoding digitally encoded, received traffic news. By addressing the memory locations, these texts can be called up. In order to ensure that the driver receives only traffic information from the region of interest to him, route-specific features are provided with an identifier. By specifying the identifier it is then possible to select only the traffic news relating to the desired region. In addition, program identification codes of stations which are responsible for broadcasting traffic news in the respective regions are stored. By comparing the stored program indentification codes, the prerequisite is created that stations which are responsible for traffic news in the region of interest to the driver are in actual fact received.

6 Claims, 2 Drawing Sheets

FIG. 2

COMPLETE PLACE- & ROUTE- & REGION-REGISTER (1...65,536)

| | | | | | |
|---|---|---|---|---|---|
| ... | | | | | |
| 30,422 | HAMBERG-FUHLSBUTTEL | A7-15 | B432-2 | | REGION 2 |
| ... | | | | | |
| 31,247 | HANNOVER-EAST | A7-64 | A2-45 | B6-21 | REGION 4 |
| ... | | | | | |
| 32,463 | HILDESHEIM | A7-68 | B1-25 | B6-27 | REGION 4 |
| 32,464 | HILDESHEIMER BORDE | A7-69 | | | |
| 32,465 | HILDESHEIM-DRISPENSTEDT | A7-67 | B494-15 | | REGION 4 |

16 a b c d

RDS RADIO RECEIVER WITH USER-DEFINABLE-REGION FILTERING

FIELD OF THE INVENTION

The invention relates to a radio receiver having a decoder for decoding digitally encoded, received traffic news and program identification codes, such as the Radio Data System (RDS) codes.

BACKGROUND

German Offenlegungsschrift 3,536,820 describes a radio traffic service decoder which is set up to process digital signals. These signals are superimposed on an auxiliary carrier which is broadcast over radio transmitters together with the FM radio program. The information contained in these digital signals can consequently be transmitted without interference parallel to the actual radio program. This also applies in particular to traffic news, which can be decoded by demodulation of the aforesaid auxiliary carrier.

If the traffic news transmitted as digital signals is drafted according to the same formation principles as the traffic news broadcast in ordinary language, then it is also possible to transmit, instead of the complete information, memory addresses which call up standardized text stored in memories at the receiving end. As a consequence, it is possible to make do with a substantially smaller data capacity during the transmission. The consequence of this is that it is now possible for considerably more traffic news to be transmitted on individual events than has hitherto been the case.

While maintaining the selection criterion hitherto used for the traffic news, which is essentially oriented to the number of drivers affected, it would be possible, also with cyclical repetition, to transmit supra-regional traffic news relating to the territory of the Federal Republic of Germany, and if appropriate the neighboring countries, over all the UHF station chains. Another possibility is to limit the region to which the traffic news relates, for instance to the catchment or reception area of the station or the station chain, but then to extend the selection of traffic news also to those events which affect only a few drivers.

Regardless of the selection of transmitted traffic news made, the volume of news would overtax the attention of the driver if all the news was presented to him optically or acoustically.

It is has already been proposed that a selection be made from the traffic news displayed or represented. This can be carried out on the basis, for example, of the planned journey route which the driver has entered via an input device as data on the route to be travelled. It is then ensured that only the traffic news relating to this journey route appears on the output device.

However, the limitation to the journey route commenced can be too narrow if the driver is also interested in the traffic situation of other places or long-term situations affecting the traffic there, since he may wish to drive to these places at short notice.

If the driver is in a border area or transitional area of stations or station chains which transmit only regionally limited traffic news, then it is possible that a station is being received which, although it transmits traffic news, does not cover the region currently of interest.

SUMMARY OF THE INVENTION

The object of the invention is to improve a vehicle receiver in such a way that, regardless of a journey route commenced, traffic events happening at selected places can be selected from the set of all the traffic news transmitted and displayed, and in which it is ensured that events in these selected places are included in the traffic news.

Briefly, the user, e.g. the drive or passenger, uses an input device to predefine the geographic region of interest for the current journey. The radio memory contains a list of the transmitter Program Identification (PI) codes for each region. These selected PI codes are compared to the PI codes in the stream of news bulletins received from the RDS decoder. When the PI codes don't match, a station-seeking circuit directs the tuner to find another station. When a PI code match does not occur, the bulletin passes to the display. Thus, the user flexibly controls the filtering of bulletins.

The refinement of the vehicle receiver according to the invention makes it possible to provide an individual zone division, that is to say both a rough and a fine division, and hence differs from the proposal of EBU (European Broadcasting Union) which envisages rigid regional zones.

The division possible as a result of the invention can here take into account different traffic densities, as well as geographical, political or also individual borders. Of particular note here is the possibility of providing a larger number of zones for a larger area, for example the Federal Republic of Germany, than the EBU proposal does with 16 zones. It can be checked here whether the station tuned or the receivable stations are responsible at all for traffic news from the regional area of interest.

In addition, if the station tuned did not transmit traffic news from the area of interest, but other receivable stations were jointly responsible for this area, then the prerequisites are created for finding these stations more easily. As a result of the common identifier of the route-specific features of limited geographical region and the program identification codes, the program identification codes are automatically also called up when a selection of the route-specific features according to a particular geographical region is made. In the case of the RDS standard defined by the European Broadcasting Union (EBU), which is used for transmitting the digitally encoded traffic news, then a further advantage is that the program identification code used there can be broadcast cyclically with each RDS data group, and the comparison of the station just received with the stored program identification code is possible very quickly.

Route-specific features of limited geographical regions is preferably understood to mean place names, since these are virtually always used for specifying a point on a route or a route section. This also makes it possible to derive other route-specific information, such as route names, from these place names. A common linking of the place names and the program identification codes makes it possible to accommodate the associated information with little memory space, and to call it up, for example, via a common address. The access time required for retrieving the data is very greatly reduced as a consequence.

An alternative envisages storing the identifiers in memory fields which comprise a memory location with an address of a memory location of an associated place name.

With this solution, although it is necessary to address different memory fields or memory locations, by substituting the place name in place of an address, it is also possible to realize here a solution in which a relatively small memory capacity is sufficient.

Other further developments envisage realizing the identifiers of the geographical regions as subsets of superordinate sets which contain common constituents of the identifiers. These regions may then overlap one another.

When selecting the region, this avoids the driver having to depend on a rigid framework. Depending on the type of traffic events anticipated, for example in the case of military exercises or in the case of natural catastrophes, the driver can decide and define whether he wishes to receive only the traffic news of a small area, for example of a local district, or that of a federal state. As a result of the overlapping, there is moreover the possibility of siting the place of particular interest in the center of the region, and thus also additionally including traffic news from the neighboring fringe areas.

It is particularly expedient, in the case of a plurality of stations or station chains of a reception area which broadcast traffic news in parallel, to store all or a selection of program identification codes of the station or station chains. In the case of unfavorable receiving conditions for the one station, it is then possible to fall back on another station and thus ensure that, when relevant traffic news is transmitted, it can also be received and decoded without interference.

It is particularly expedient to provide the radio receiver having the features according to the invention with a search facility which is started by the input device or the comparator for program identification codes of the station with stored program identification codes when these codes do not match, and is stopped when they match.

In this way, operation is considerably simplified, in that the driver thus only has to enter the desired geographical region from which he wishes to hear traffic news or have it displayed, but the tuning of the corresponding station is left to the receiver. As a further refinement, a comparison can also be made here between the stations in question, and the station which can be received best (this can be either the strongest or the one with fewest transmission errors) can be selected.

DRAWINGS

Further developments and advantageous refinements of the invention emerge from the claims, the further description and the drawing, which illustrates an exemplary embodiment of the invention, and in which:

FIG. 1 shows a block circuit diagram of a vehicle receiver of the invention, and FIG. 2 shows a table of a memory dump according to a refinement of the invention.

DETAILED DESCRIPTION

Figure 1:
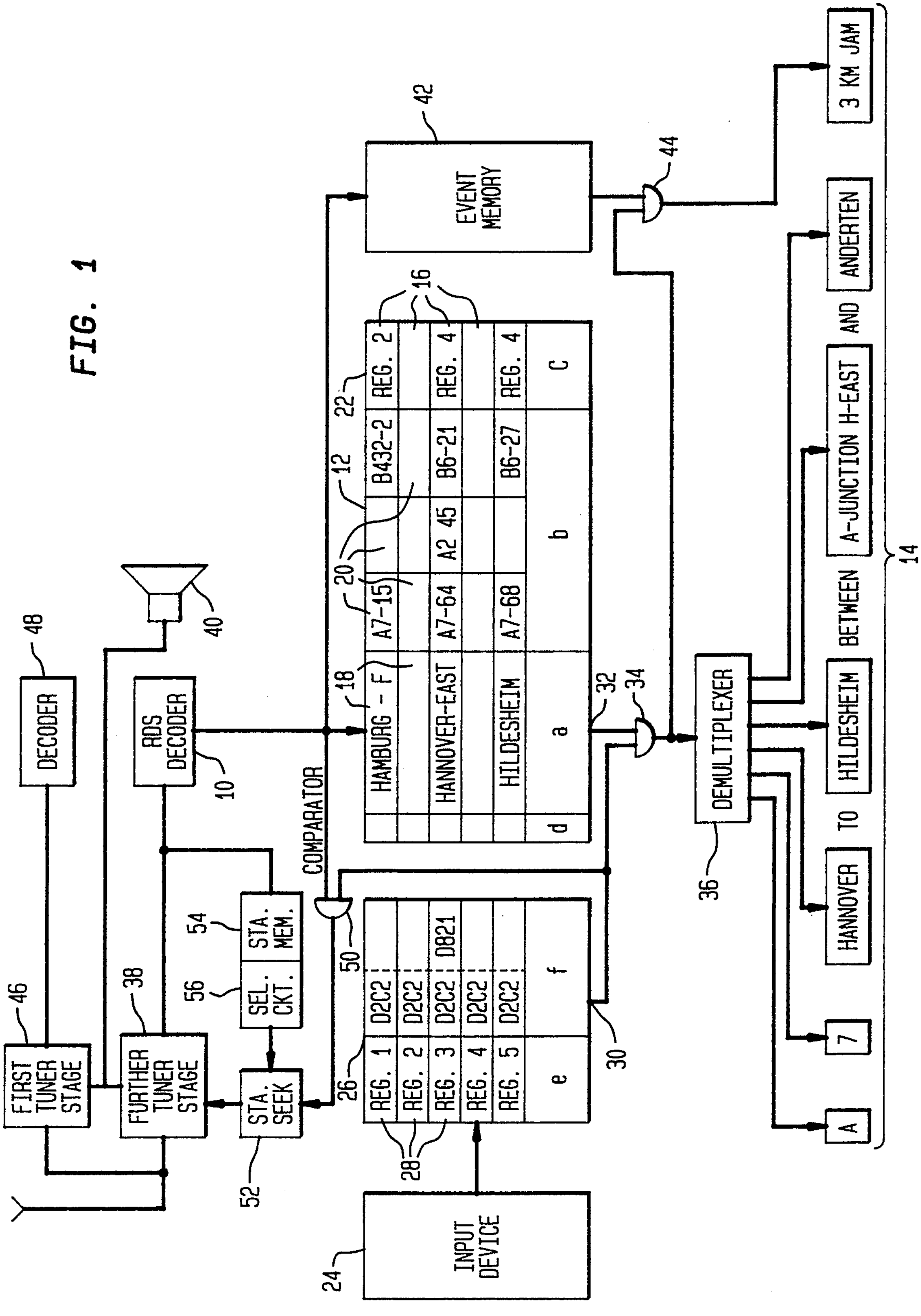

FIG. 1 shows a vehicle receiver which comprises a first receiving part or tuner stage 46 with a loudspeaker 40 as well as a decoder 48 downstream of the receiving part 46, and a further receiving part or tuner stage 38 with a decoder 10 downstream of the receiving part 38 for decoding digitally encoded, received traffic news as well as program identification codes.

The decoder 10 has an output connected to address inputs of a first memory device 12. The memory device 12 comprises memory fields 16 with memory locations 18, 20 and 22, which can be selected via addresses. Connected to the memory device 12 is a logic element 34 which leads via a demultiplexer 36 to an optical output device 14. Furthermore, an event memory 42 is provided, the address inputs of which are likewise controlled by the decoder 10 and which leads to a further field of the optical output device 14.

An input device 24 for route-specific features is connected to a second memory device 26 which contains memory fields 28 for region identifiers e and program identification codes f. An output 30 of the memory device 26 is likewise connected, as the aforesaid output 32 of the memory device 12, to the logic element 34.

In addition, the output 30 of the memory device 26 leads to a comparator 50, which likewise receives signals of the decoder 10. This comparator 50 serves for checking the matching between the program identification code transmitted and the one selected in the memory device 26. Its output could be connected to a further display field of the optical output device, but in the exemplary embodiment it is connected to a station search facility or station-seeking control stage 52. The station search facility 52 in turn controls the receiving part 38.

Finally, a further memory 54 for the receivable stations and a selection circuit 56 for the station which can be received best are provided, which receive signals of the receiving part 38 and are additionally connected to the station search facility 52.

In the memory records or device 12, memory fields 16 are addressed via addresses d, which are activated by data of the decoder 10. The memory fields 16 are divided into memory locations 18 for place names a, memory locations 20 for other route-specific features b, such as motorways or trunk roads with junction numbers, and memory locations 22 with region indentifiers c. In the present case, only one region identifier c is assigned to each place name a. In the case of overlapping, however, it is also possible to use a plurality of region identifiers c. In addition, the region identifiers c could be hierarchically structured, so that it is also possible here to make a rough or fine division.

The memory records or device 26 contains addressable memory fields 28 too. Stored in the memory fields 28 here are region indentifiers e, as also arise as region identifiers c in the memory locations 22 of the memory device 12. In addition, the memory fields 28 contain program indentification codes f of those stations or station chains responsible for traffic news in the respective regions with the region identifiers e. In this case, one or more program identification codes f can be allocated to each region identifier e.

If the receiver is set up for receiving traffic news which is transmitted according to the RDS system over the "traffic message channel", then the program identification code corresponds to the PI code in accordance with the EBU specifications, as is present in each RDS group in block 1. The program identification code then comprises four hexadecimal characters. The first character designates the country, and is, for example, the letter D for the Federal Republic of Germany and Libya. The second character represents an area code number, which corresponds to the ARI (U.S. TM Reg. Nos. 1,264,507 & 1,282,281—Blaupunkt Werke (GmbH) traffic zones A–F in the Federal Republic of Germany for example. The third and fourth character, finally, represents a station or a station chain of a broadcasting company. Thus the PI code for NDR 2 is, for example, D2 C2.

If the driver wishes to receive only traffic news from a particular region, then he can select the desired region with the region identifier e by utilizing the input device 24. In this case, the corresponding memory field 28 is addressed which contains the respective region identifier e as well as the program identification codes f of the stations or station chains responsible for this region. These program identification codes f are then also present at the comparator 50, which compares them with the program identification code of the station just received and decoded by the decoder 10.

If the program identification codes do not match, then the connected station search facility 52 is started and causes the receiving part 38 to tune itself to the next receivable station. If this station now has a program identification code which matches the one selected in the memory field 28, then the search facility 52 is stopped by the output signal of the comparator 50, and the receiving part remains locked to the respective station. Otherwise, a further station is searched for.

If there are a plurality of receivable stations, then the station search facility can also be controlled in such a way that first of all it sweeps over the entire receiving range for receivable stations and temporarily stores the frequencies of the receivable stations in a memory 54, and the station which can be received best is selected by a selection circuit 56. This station which can be received best is then specifically selected after sweeping over the receiving range.

Once, therefore, the or a station responsible for traffic news in the selected area has been tuned, the decoded traffic news is then selected according to whether it relates to the region of interest. This is done in that the region identifiers e are tested for matching to the region identifiers c of the just addressed memory fields 16. As long as there is no matching, the logical element 34 filters out and prevents the corresponding messages being displayed. If, on the other hand, a memory field 16 which has the same region identifier c as the selected region identifier e in one of the memory fields 28 is addressed, then the data relating to the message text proceed via the demultiplexer to the optical output device 14. At the same time, the event memory 42 is also enabled via a further logic element 44, whereupon the stored event also appears in the corresponding display field of the output device 14.

A message text, which is called up and put together from stored data by corresponding addressing of the memory locations, is represented here in the display fields of the output device 14.

FIG. 2 shows a further memory dump from the memory device 12, the place, route and region register being stored in the memory fields 16. For the territory of the Federal Republic of Germany, 65,536 different place names result for local determination of traffic events, which are however stored only once in the memory device 12. Accordingly, $2^{16}$ different bit combinations are required for addressing the memory fields 16. These addresses are denoted by d.

Beside the place names a, other route-specific features, e.g. route names, are also stored. The route names consist of, for example, one or more motorway or trunk road exits. In the areas with particularly dense traffic, for example if several motorways or interstates intersect and have different identifications from the junction onwards, a large number of route names can be assigned to a single place name.

Finally, in the memory fields there is also space for memory locations which contain the region indentifiers c required for the comparison with the further memory device 26. These region identifiers can be composed of digits which rise from 1 to the number corresponding to the number of zones into which a forecast area is divided for the traffic news. In this case, each place name which is included in the same geographic region contains the same region identifier. In the case of overlapping regions, it is also possible to allocate a plurality of region identifiers c to one place name.

We claim:

1. A radio receiver, having a tuner stage (38) having an output, a decoder (10), having an input connected to said output of said tuner stage (38), and decoding digitally-encoded, received traffic news bulletins, and program identification (PI) codes in accordance with the Radio Data System (RDS), a first memory device (12) having an input connected to the output of said decoder, and storing route-specific features, namely geographic region identifiers (22) and at least one of:

place names (a, 18), junction identifiers (20), route identifiers, and route segment identifiers (b);

a second memory device (26) storing, in each of a plurality of respective memory locations (28), a geographic region identifier and a Program Identification (PI) code, including data uniquely identifying each radio transmitter;

means (36, 14), connected to an output (32) of said first memory device (12), for indicating, to a user, information from said memory device which is relevant to said received traffic news;

wherein input means (24), connected to an input of said second memory device, are provided for defining at least one geographic region about which the user desires to receive traffic news bulletins;

the geographic region identifiers stored in said first and second memory devices (12, 26) correspond to each other, a comparator (50) receives and compares an output signal from said RDS decoder )10) with an output signal from said second memory device (26), and triggers a station-seeking stage (52) whenever respective PI codes in said output signals do not match; and logic means (34), having respective inputs connected to respective outputs (32, 30) of said first and second memory devices (26, 12), selectively actuate said indicating mans (36, 14) whenever a PI code of a received traffic news bulletin matches a PI code of a geographic region (28) stored in said second memory device (26).

2. A radio receiver according to claim 1, wherein each record (16) stored in said first memory device (12) which contains a place name (a) also contains a region identifier (c) associated with said place name.

3. A radio receiver according to claim 1, wherein each record (16) stored in said first memory device (12) has a unique address (d) which facilitates simultaneous retrieval of both a region identifier (c) and an associated place name (a).

4. A radio receiver according to claim 1, wherein the program identification codes (f) are stored in memory locations (28) which each store a plurality of program identification codes of different stations which broadcast traffic news for the same region.

5. A radio receiver according to claim 1, wherein said input means (24) has an output which is connected to an input of the second memory device (26) for purposes of selecting and specifying said at least one geographic region identifier (e), and said station-seeking stage (52) controls said tuner stage (28) to tune only to a transmitter whose PI code identifies it as carrying traffic news bulletins relating to the region specified, said comparator (50) triggering said station-seeking stage to tune to a different transmitter whenever a PI code received via said RDS decoder (10) from a currently tuned transmitter does not match any PI code stored in said second memory device (26).

6. A radio receiver according to claim 1, further comprising a third memory (54), connected to said output of said tuner stage (38), and serving to store transmitter frequencies of each station or transmitter, the strength of whose received signal exceeds a predetermined minimum reception level; and a selection circuit (56), connected to an output of said third memory (54), and serving to identify, from among those stations stored in said third memory (54), the station which can be received best, said selection circuit having an output connected to the input of said station-seeking stage (52).

* * * * *